United States Patent [19]

Späth

[11] Patent Number: 4,674,165

[45] Date of Patent: Jun. 23, 1987

[54] METHOD FOR MANUFACTURING ROUNDED PARTS, SUCH AS MOTOR VEHICLE CONSISTING OF WHEEL RIMS

[76] Inventor: Walter Späth, Friedrich-Werber-Str. 32, Radolfzell, Fed. Rep. of Germany, 7760

[21] Appl. No.: 618,049

[22] Filed: Jun. 7, 1984

[30] Foreign Application Priority Data

Jun. 9, 1983 [DE] Fed. Rep. of Germany ....... 3320927

[51] Int. Cl.4 .......................................... B21H 1/02
[52] U.S. Cl. .................................. 29/159.01; 72/301
[58] Field of Search ..................... 29/159.1, 159.01; 72/151, 298, 301, 303, 308, 310, 406

[56] References Cited

U.S. PATENT DOCUMENTS

| 1,437,628 | 12/1922 | Wulff | 29/159.1 |
| 2,350,379 | 6/1944 | Weightman | 72/406 |
| 2,806,505 | 9/1957 | Minarczyk, Jr. | 72/151 |
| 3,148,721 | 9/1964 | Seavers | 72/151 |
| 3,522,644 | 8/1970 | Cavagnero | 29/148.4 R |
| 4,266,417 | 5/1981 | Imamura et al. | 29/159.1 |
| 4,454,978 | 6/1984 | Schneider et al. | 72/406 |

FOREIGN PATENT DOCUMENTS

| 3714818 | 9/1962 | Japan | 29/159.1 |
| 1018748 | 5/1983 | U.S.S.R. | 72/298 |

Primary Examiner—Percy W. Echols
Attorney, Agent, or Firm—Lilling & Greenspan

[57] ABSTRACT

The inventive method produces round parts consisting of profiled metal sections from a straight, profiled extruded section forming a wheel-like shape having butt ends joined together by welding. Bending the straight section into a round part is accomplished by first adjustably prestressing the straight section and then subjecting the prestressed section to a rolling bending operation. For this purpose, the section to be bent is wound either from one side or from both sides around the outside diameter of coordinated rolling dies the rotating rolling dies being able to additionally perform a translatory motion in the direction of the longitudinal axis of the section. The resulting wheel rim has the rim pan integrally joined to the rim ring.

3 Claims, 25 Drawing Figures

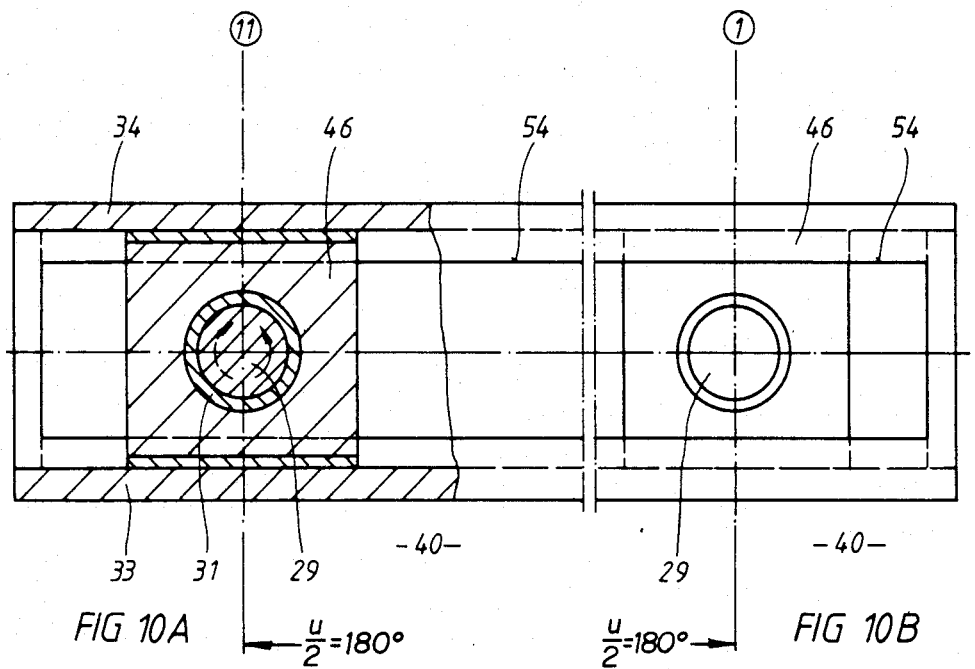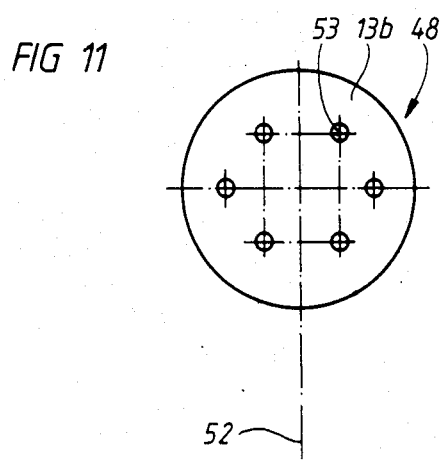

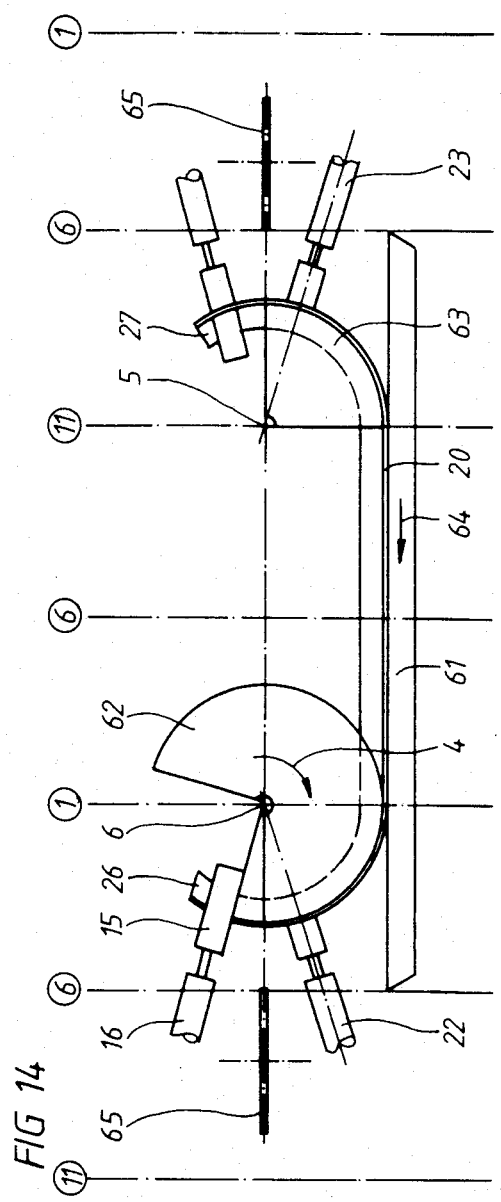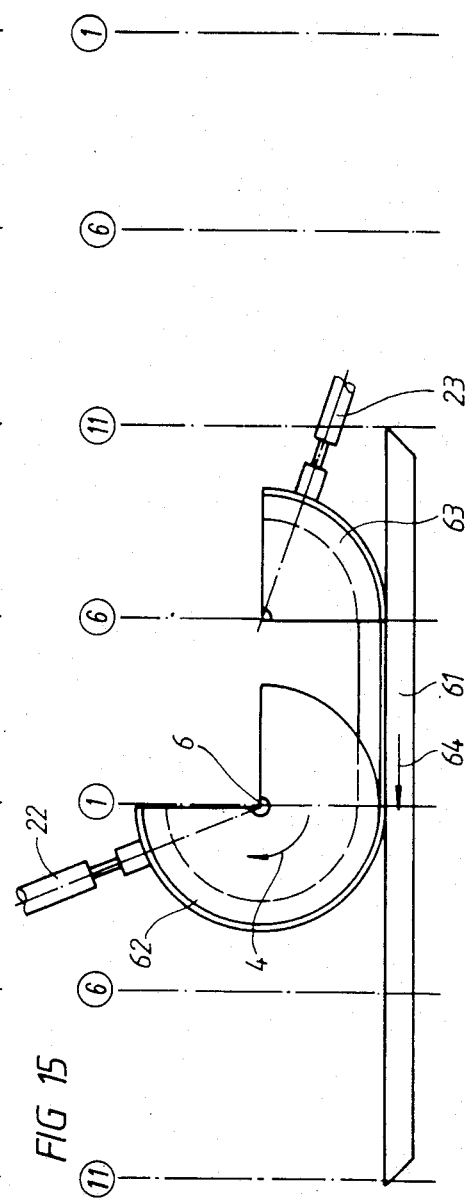

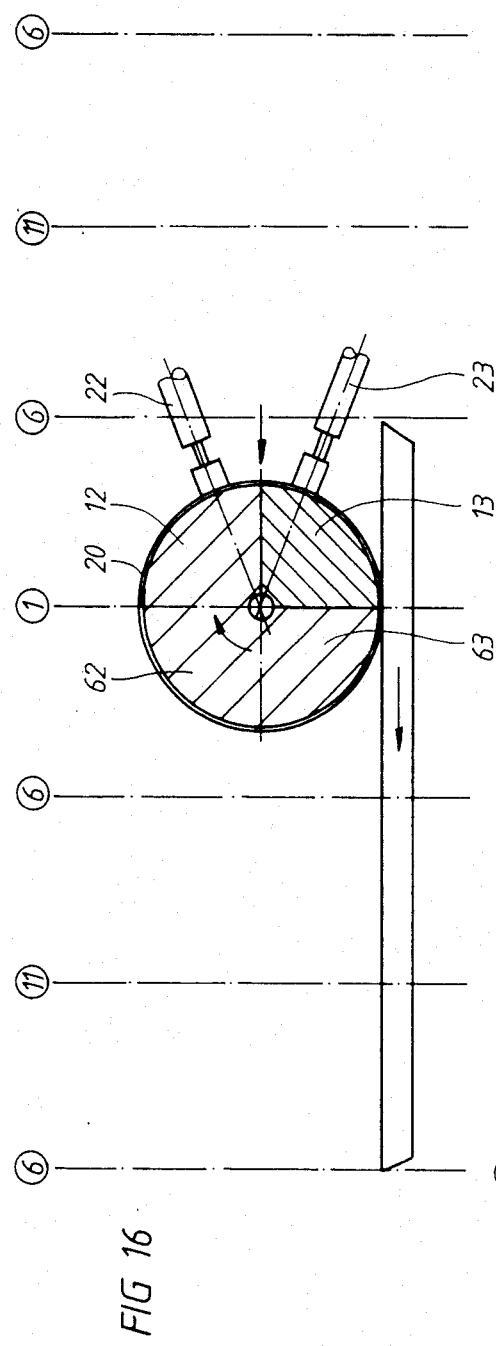
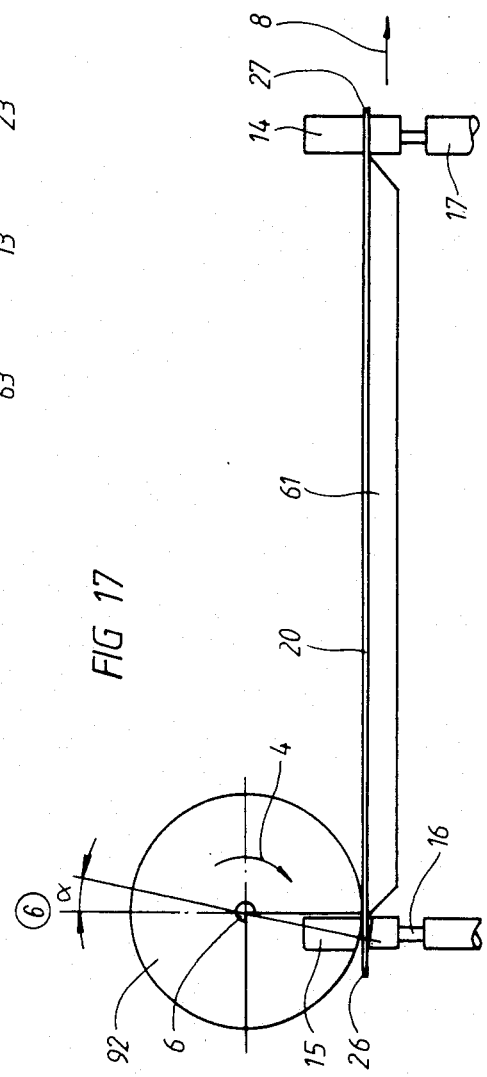
FIG 16
FIG 17

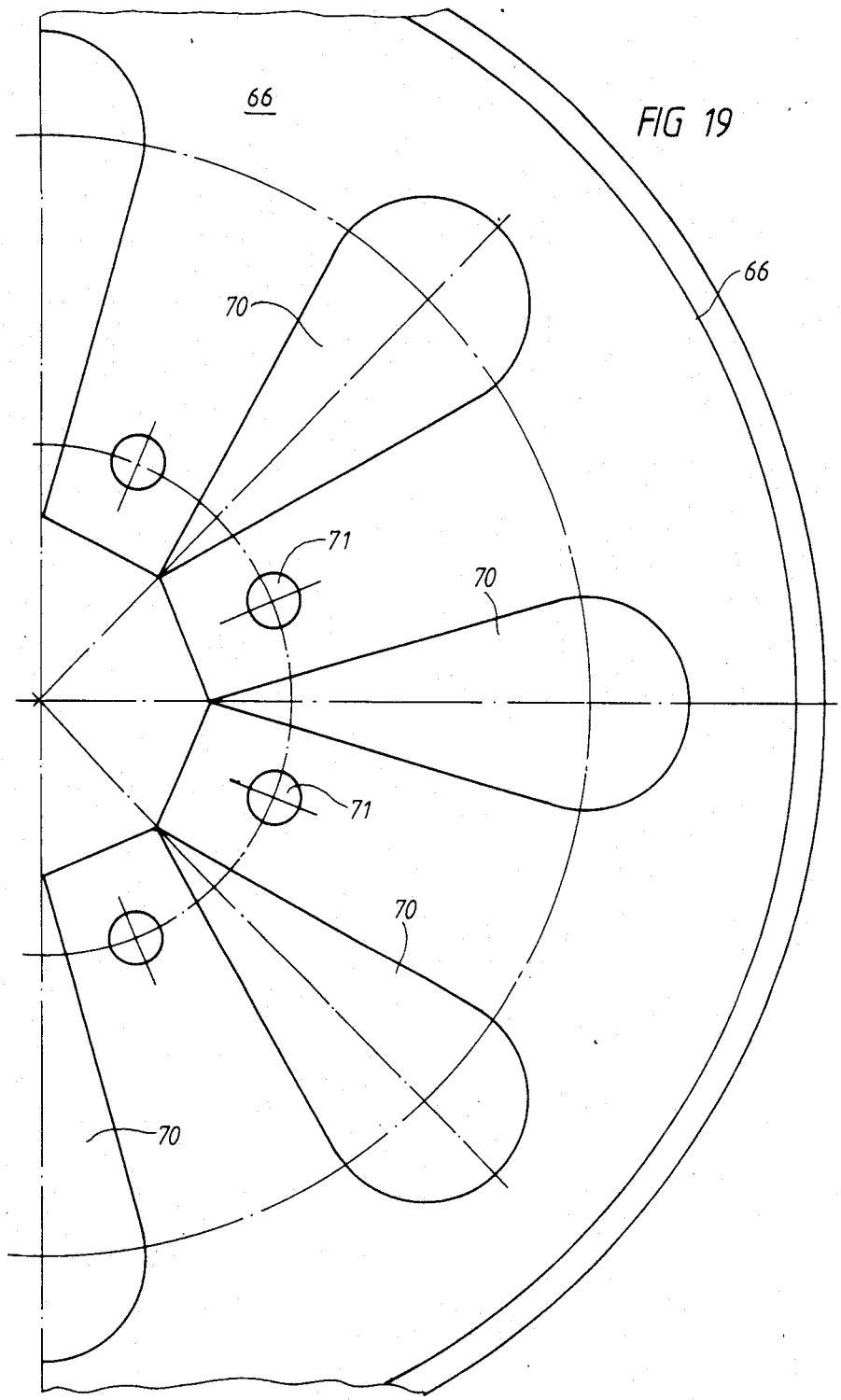

METHOD FOR MANUFACTURING ROUNDED PARTS, SUCH AS MOTOR VEHICLE CONSISTING OF WHEEL RIMS

FIELD OF THE INVENTION

This invention relates to a method and apparatus for manufacturing rounded parts having profiled metal sections such as those sections used as wheel rims for motor vehicles. An extrusion strip forming the rounded portion is preformed to contour to the profile of a wheel rim, prior to introduction into the bending process. The profile exrusion strip is bent in a circular fashion to achieve the final shape of the rim, and is connected to the wheel rim by welding the butt joints.

BACKGROUND OF THE INVENTION

The Federal Republic of Germany Patent Application P No. 30 28 956.6, traced back to the same applicant, suggested a method of the kind mentioned above in which the profiled rim section is clamped to a single bending core of round shape and bent around this bending core. This bending operation was based on generating the prestressing required for bending by friction between the brake shoe and the workpiece. A disadvantage of this method is that this bending operation requires a relatively large amount of time and equipment. For the rim to be bent it must first be prebent on a first piece of equipment, and then transferred to a second piece of equipment to complete the bending procedure. The transfer from one machine to another takes a relatively long amount of time and the use of two different machines was relatively costly. In addition, the friction-generated prestress of the workpiece was not easy to check.

Through German Democratic Republic DE-OS No. 26 50 357 another bending method has become known in which the rim section, originally in the shape of a straight, profiled extrusion, is pulled along a sliding block. But this method is disadvantageous in that the sliding block shows considerable wear which changes the shape of the profile and modifies the bending resistance in the course of time, so that mass production of uniform quality is not possible with one and the same tooling setup, because the sliding blocks must be replaced relatively often.

Moreover, the symmetry of shape of the motor vehicle wheel rim subjected to the bending operation is not ideal because in the above mentioned, known methods the bending process is always initiated from one side of the profiled rim section only and, starting from this side, is continued to the opposite end of the rim, in what is known as a unilateral bending operation. Such a unilateral bending operation can easily lead to out-of-roundness of the finish-bent rim, requiring a subsequent rolling operation to eliminate the out-of-roundness again.

SUMMARY OF THE INVENTION

The basic fact is pointed out that the field of application of the present invention relates not only to the manufacture of motor vehicle wheel rims, but generally to the production of round parts consisting of a profiled metal section, especially an aluminum section. It is only for the sake of simplicity that the production of a motor vehicle wheel rim is described in the later description of the invention, although, as a matter of course, any other round part can also be produced by the method described.

Accordingly, starting from the method of the kind mentioned at the outset, it is an object of the invention to develop such a method so that round parts, in particular wheel rims, can be bent considerably faster, cheaper, and more accurately.

To solve this problem, the invention is characterized by the following method steps: p1 (a) the originally straight profiled section is first adjustably prestressed, and (b) the prestressed, profiled section is then subjected to a rolling/bending operation.

Therefore, the profiled section, consisting of a straight part (for example, a profiled aluminum alloy extrusion) is chucked at both its ends between coordinated chucking dies. The two chucking dies are moved away from each other in the direction of the longitudinal axis of the profiled section so that the profiled section is prestressed in tension in the direction of its longitudinal axis. This tension is maintained throughout the entire rolling/bending operation and equalizes the shearing stresses caused by the bending to achieve bending without distortion. For the same purpose it is provided according to the invention that a profiled roll-off rail section be pressed against the underside of the profiled section, i.e. opposite the rolling die, with adjustable force.

Now, the rolling/bending operation can be executed in several different ways. A first embodiment is that the profiled section is chucked at both its ends to the outside diameter of a semicircular rolling die, the two rolling dies subjecting the profiled section first to a prestressing operation and then performing a rotary motion in conjunction with a translatory motion in the direction of a common transverse center axis, the profiled section, chucked to the outside diameter, being bent around the outside diameter of the rolling dies during the rolling motion of the two rolling dies.

In other words, the chucking tools are connected to the rolling dies so that, in the sense of the above description, the rolling dies themselves, in conjunction with the chucking dies, furnish the prestressing required for bending.

When the bending operation is concluded, both rolling dies then combine to form a single, rotation-symmetrical part disposed inside the finished round part. To be able to pull the rolling dies out of the interior after the completion of the bending operation, they are split twice or more.

It is essential that the rolling motion of the rolling dies takes place along the profile track of a profiled roll-off rail section pressed with a specified force against the outside diameter of the coming dies rolling off the profiled roll-off rail section. In the space between the outside diameter of the rolling dies and the profiled roll-off rail section the profiled section to be produced is bent into a round part. The advantage of the method according to the invention is that, by starting at both ends, the originally straight profiled section is uniformly bent inwardly because a preload is applied. The production rate for the forming operation is doubled while halving the bending time when compared to the known methods where the profiled section, is chucked at one end only and then bent around a revolving core bending part. The bending method described may also be called a rolling/stretching/bending method because the profiled sections to be bent are necessarily subjected to a stretching operation at the outside diameter of the rolling dies resulting in uniform deformation. However, the tension applied to the profiled section during the bending operation stays below the yield point—predominantly and variable—if the profiled section is straight.

In the hitherto known bending method there was no mirror image bending behavior of the profiled section to be bent, whereas in the present invention the profiled section is being bent exactly in mirror image relative to its transverse center axis, thereby already achieving better roundness of the profiled section. Therefore, the symmetry of shape achieved here is ideal. This ideal symmetry of shape was not attainable by the hitherto known methods. It is necessary, therefore, to have a subsequent rolling operation follow to obtain this desired symmetry of shape. According to the invention, this symmetry of shape is already obtained by the work cycle of the rolling dies.

Because the profiled section is bent under constant prestress, the resultant concentricity is ideal without the need for secondary operations, such as a subsequent rolling operation.

Another essential feature of the present invention is the combination of two different bending methods in a single machine, that is, the roller bending operation and the core stretch-bending operation. The first step of the method relates to a prestressing operation to the straight profiled section which is first chucked then preloaded in order to be then subjected in its prestressed state to the core stretch-bending operation. These three steps of the method result in the rolling/stretching/bending method according to the invention.

The prestressing of the profiled section and the subsequent roll/stretch/bending operation has a significant advantage over prior art methods in that the profile of the material cannot deform due to the fact that the prestressing operation is carried out first and the profile is framed by the rolling core and the profiled rail section, which also makes it possible to bend relatively complicated profile shapes with great accuracy, including strips of small diameters having complicated profiles. This means that the forming magnitude, i.e. the ratio of the depth of profile to the bending diameter can be relatively unfavorable, and yet a precise bending operation is possible because at the moment of the forming operation, the profiled section is at the same time supported by the rolling core and the profiled rail section. The prestress is always adjustable for adaptation to differing characteristics of the materials to be bent.

Another embodiment of the invention provides for the winding motion actually performing the roll/stretch/bending operation to be carried out by a single rolling die which is rotatably mounted in a machine frame, but its shaft is locally fixed, while the opposing rolling die is only movable parallel to the longitudinal axis of the profiled section and to the roll-off rail. This arrangement simplifies the bending machine because only one single rolling die need be movable in the lengthwise direction of the profiled roll-off rail section, while the other rolling die is only designed to revolve and has a stationary shaft.

A third embodiment provides for the existence of only one single rolling die, designed to revolve about its stationary shaft and performing the winding motion to wind up the profiled section. The opposite end of the profiled section is retained by a chucking die which also furnishes the tension acting in the longitudinal direction of the profiled section. This chucking die is movable along the winding path (i.e. in the direction of the lengthwise axis of the profiled roll-off rail section) and is being moved towards the rolling die during the latter's rotary motion, while maintaining its prestress. The rolling die thus pulls the chucking die to itself like a rope winder, if the profiled section to be bent may be compared with a rope.

In addition, a completely novel profile can be produced by the suggested roll/stretch/bending method. Separate protection is claimed for this profile. Prior to the inventive process, a wheel rim had to be made in two parts, namely a rim ring and a rim pan inserted in the inside diameter of the rim ring. The rim pan had to be joined to the rim ring in a separate operation rather than be made as an integral, single-piece part as in the subject process. According to the invention, a wheel rim consisting of a rim ring and a rim pan made of a single material joined together as a single unit is now being produced. This process saves the costly connecting operations between the formation of the rim ring and the rim pan and provides a specifically prestressed connection between rim ring and rim pan whose structure is not disturbed by other materials (e.g. a welding seam).

To produce such a complete wheel rim having the rim pan connected to it as a single unit, a profiled bar having a leg approximately perpendicular thereto is selected. When bending this profiled bar into a circle by the roll/bending method, according to the invention, the leg projecting perpendicularly from it is also bent round, thus forming the rim pan projecting radially inward. This causes material displacements which can be compensated for by providing appropriate slots, ribs and the like.

In another preferred embodiment, the rib pan is not completely bent during the roll-bending operation, but is bent to form a projection protruding radially inward. After the rim ring is completely bent and the butt joints are welded, this protruding projection is subject to a flow/press/forming operation and, at the completion of this forming operation, the rim pan is completely bent to connect to the inside of the rim ring.

All data and features disclosed in the documents, in particular the physical layouts shown in the drawings are claimed as essential parts of the invention, to the extent they are novel, singly or in combination, relative to the state of the art.

BRIEF DESCRIPTION OF THE DRAWINGS

FIG. 10A is a cross sectional view taken along lines X—X in FIG. 9, showing a traveling position of the guide carriage.

FIG. 10B is a cross sectional view taken along lines X—X in FIG. 9, showing a second traveling position of the guide carriage.

FIG. 11 is a cross sectional view taken along lines X1—X1 in FIG. 9.

FIG. 14 is a side view of the rolling dies after continued bending.

FIG. 15 is a side view of the rolling dies prior to the completion of the bending operation.

FIG. 16 is a side view of the rolling dies at the completion of the bending operation.

FIG. 17 is a side view of the rolling dies in the initial stage of the roll/stretch/bending operation in a third embodiment of the invention.

FIG. 19 is a top plan view of a rim pan at the completion of the bending operation.

DETAILED DESCRIPTION OF THE INVENTION

In the FIGS. 1 through 8 are indicated, on the axis 2, position markings 1 through 11. Position 1 indicates the bending angle 0°, while position 11 indicates the bending angle of 180°. The positions are local markings along the abscissa to be able to follow the motion cycle of the two rolling dies better.

Figure 1:
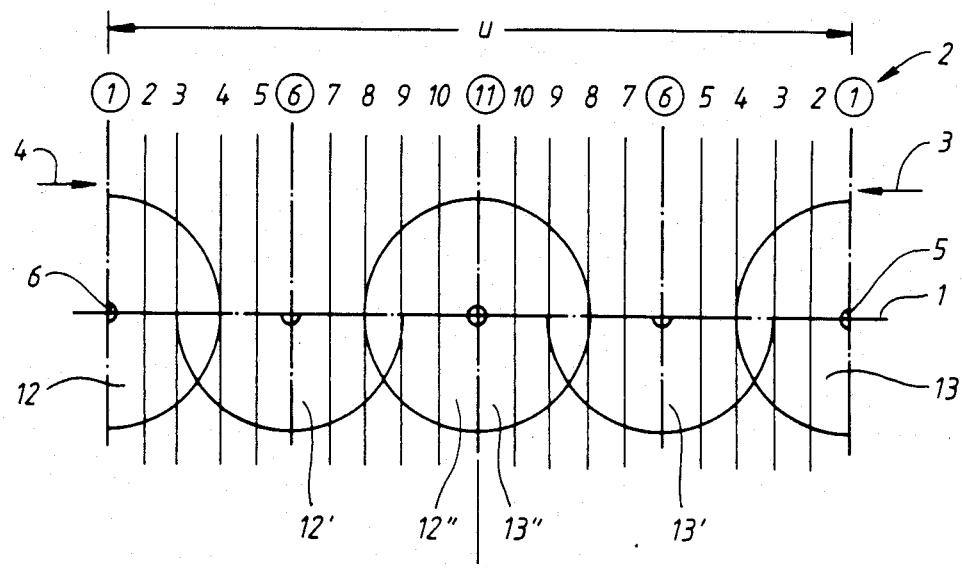
FIG. 1 is a schematic diagram illustrating the movement of the rolling dies in a first embodiment of the invention.

FIG. 1 shows that two semicircular rolling dies 12, 13 oppose each other at a distance at position 1 on a rolling plane 1. The center distance of the rolling dies 12, 13 corresponds exactly to the circumference U of the round part to be produced later.

Also shown is that the two rolling dies 12, 13 approach each other in the direction of a common transverse center axis 60 (at position 11) in arrow direction 3 and 4, respectively, the rolling dies 12, 13 performing a rotary motion at the same time. Each rolling die is shown in three different phases, namely, in the basic position shown without index and an intermediate position 12' and 13', respectively, showing the position bent by 90°, and in the finish-bent position shown as position 12", 13".

After completion of the roll/stretch/bending operation, therefore, the rolling dies 12, 13 combine to form one uniform round part of the circumference U. To the outside diameter of the round part is then chucked the finished-bent profiled section, as explained in the following.

Figure 2:
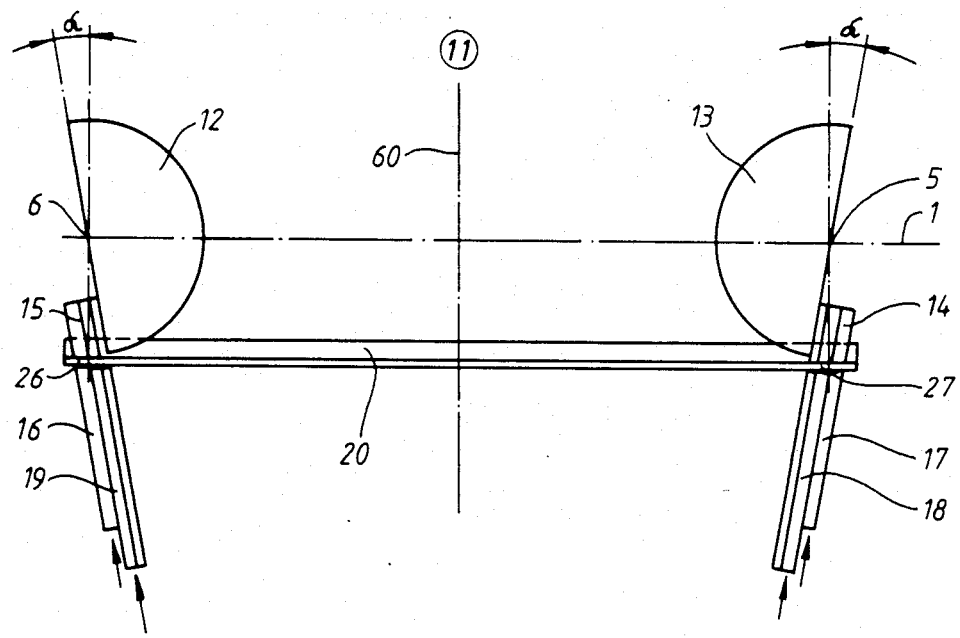
FIG. 2 is a side view of the rolling dies following the chucking of the profiled section free ends.

According to FIG. 2, the profiled section 20 is prestressed first during the rolling/bending operation. To do this, the straight profiled section 20 is chucked to the outside diameter of the respective rolling die 12, 13. The section is inserted from the top into a female chucking die 14, 15 and from the bottom a male chucking die 16, 17 is placed against it so that the respective end of the profiled section 20 is firmly joined to the outside diameter of the rolling die 12, 13. The arrows should at the bottom of FIG. 2 indicate, on the one hand, the clamping direction of the male chucking die 16, 17 and, on the other hand, the cutting direction of the shearing blade 18, 19 which will be described later.

Figure 3:
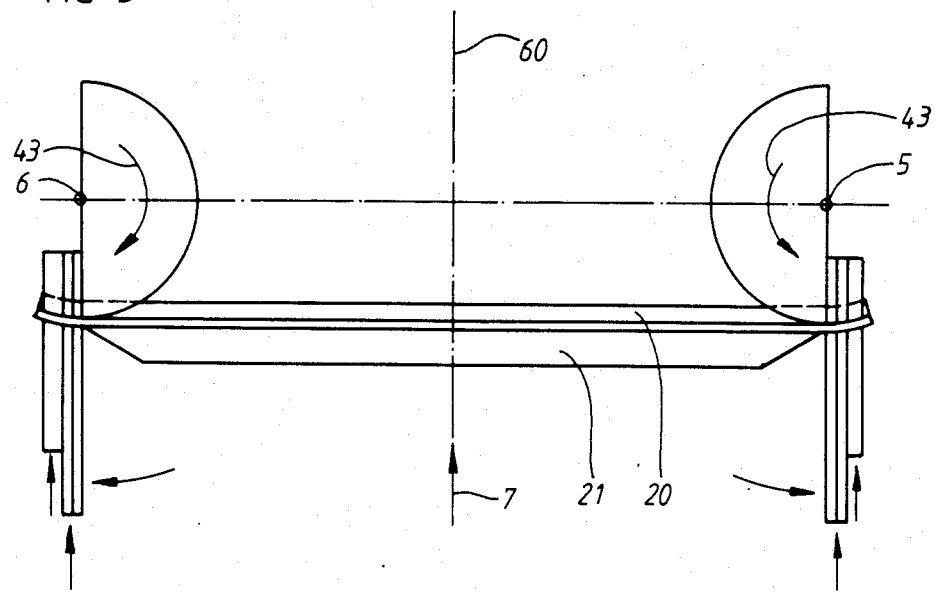
FIG. 3 is a side view of the rolling dies at the completion of the stretch operation. p

It is important in this embodiment that the rolling dies 12, 13 are first turned outwardly by an amount measured as angle alpha and then, in the transition to FIG. 3, are turned outwardly in arrow direction 43 with the shaft 5, 6 fixed locally so that the profiled section 20— due to the retained shaft 5, 6 at position 1—is preloaded in its longitudinal direction with an adjustable force.

Associated therewith is the significant advantage that deformations otherwise occurring during the rolling/bending operation are avoided because the resistance moment of the profiled section is overcome.

The two rolling dies 12, 13 then perform a rotary motion in the arrow directions 3, 4, the various positions of the rolling dies being shown in detail on the axis 2 in FIG. 1. The locally retained shafts 5, 6 at position 1 are then released so that both rolling dies perform a translatory motion along the roll-off plane 1 in addition to their rotation.

Figure 4:
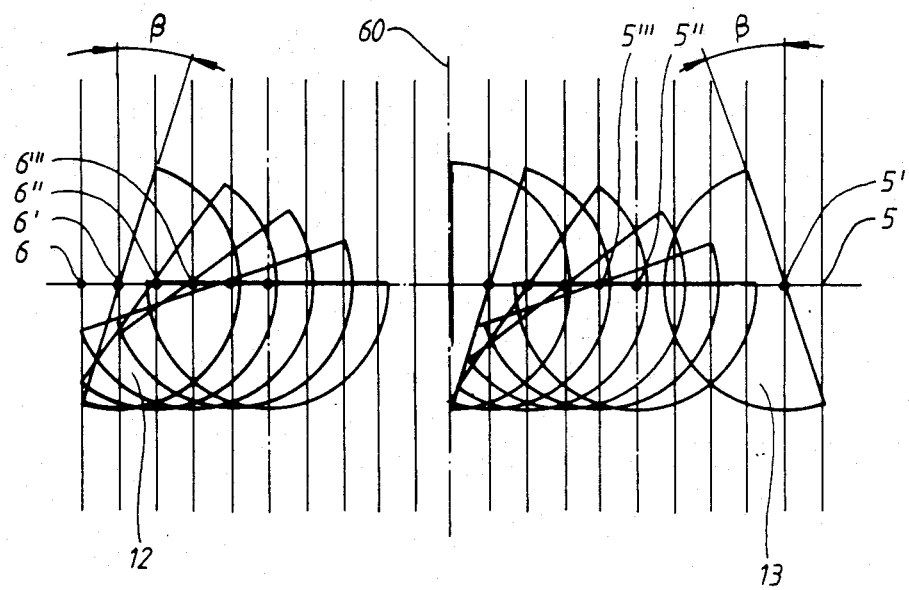
FIG. 4 is a schematic diagram illustrating, on the left hand side, the left rolling die during a 0° to 90° bending and, on the right hand side, a right rolling die during a bending operation from 90° to 180°.

It may be seen from FIG. 4 what this combined rolling and translatory motion of the two rolling dies 12, 13 looks like; the left picture of FIG. 4 shows only the motion of the rolling die 12 from position 1 through position 6 (axis 2 in FIG. 1), whereas the right picture in FIG. 4 shows the motion of the rolling die 13 from position 6 through position 11 (axis 2 in FIG. 1). However, the rolling motions of the two rolling dies 12, 13 are entirely symmetrical relative to each other.

The angle beta shown in FIG. 4, in relation to angle alpha in FIG. 2, should make it clear that when the rotary motion is continued as shown in FIG. 4, the shaft 5, 6 is no longer retained but assumes the positions 6', 6", 6''' etc; this means that it performs a translatory motion in the direction towards the transverse center axis 60, with the same applying to the right shaft 5.

It is also important in FIG. 3 that throughout the entire bending operation under prestress a straight profiled roll-off rail section 21 is placed against the underside of the profiled section 20 in order to avoid profile deformations which could possibly still occur during the bending operation. The profile of the roll-off rail section 21 matches the profile of the section 20 to be bent so that the section 20 to be bent is in form closing contact with the profiled roll-off rail section 21. It is important in this connection that the profiled roll-off rail section 21 is pushed in arrow direction 7 against the underside of the section 20 to be bent, and the profiled roll-off rail section 21 is also pushed against the underside of the rolling die 12, 13, thereby achieving a form closing connection between the rolling die 12, 13 on the one hand and the profiled roll-off rail section 21 on the other.

The profiled roll-off rail section thus forms a fixed bending path for the profiled section 20 to be bent by it.

Figure 5:
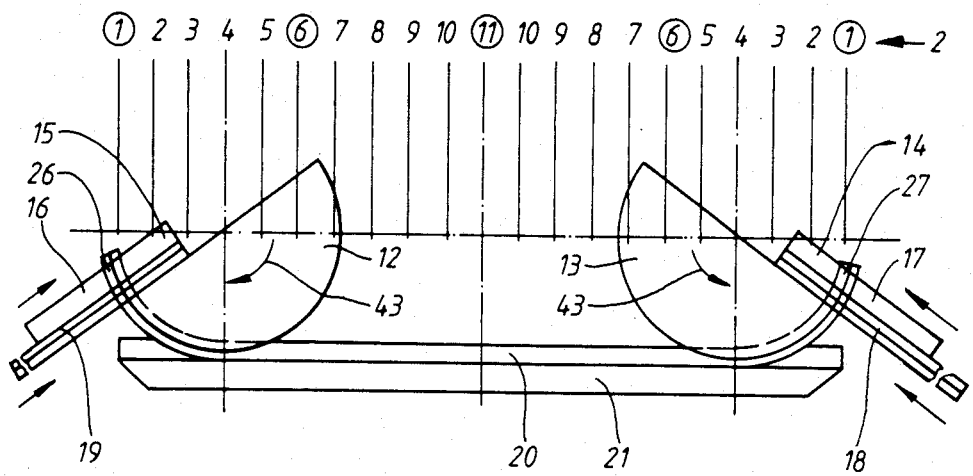
FIG. 5 is a side view of the rolling dies during a bending operation in the 0° to 90° range.

FIG. 5 shows the further progress of the rolling-/bending operation, in which the rolling dies 12, 13 are turned further in the arrow directions 43, with the shafts 5, 6 now having reached the position 4 (on the abscissa 2). The profiled roll-off rail section 21 continues to be pressed against the underside of the rolling dies 12, 13 with a constant force.

Figure 6:
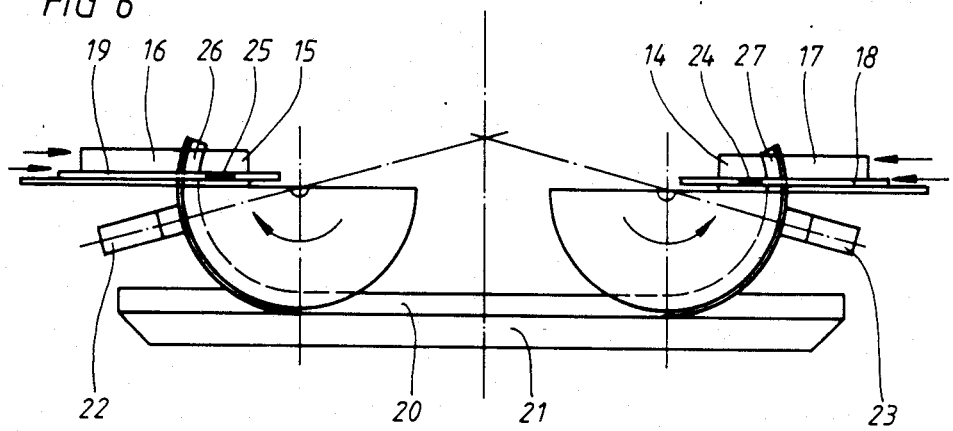
FIG. 6 is a side view illustrating the shearing of the chucked ends of the rolling die at the completion of bending the 90° angle.

FIG. 6 shows that there is provided at position 6, on the outside diameter of the section 20 between the chucking end 26, 27 and the top surface of the roll-off rail section 21, another make chucking die 22, 23 which now contacts the profiled section 20 in clamping fashion, assuming the chucking task of the still chucked male chucking dies 16, 17 in conjunction with the female chucking die 14, 15.

After chucking with the make chucking dies 22, 23, the chucking dies 16, 17 and 14, 15 still remain chucked; at the same time, the shearing blade 18, 19 is moved inwardly in the arrow direction shown, and a piece 24, 25 is stamped out of the chucked end 26, 27, thereby separating the chucked end 26, 27 from the profiled section 21.

In analogous application of the above described operation it is also possible, of course, to provide a cutting or shearing operation instead of the stamping operation with the shearing blade 18, 19.

It is also possible to employ a sawing operation instead of the separating operations described.

It is of further importance to make sure that the parts 14, 15 and 16, 17 as well as the male chucking dies 22, 23 always corotate in the rotary motion in arrow direction 43. After the separating operation, i.e. after the chucked ends 26, 27 are cut off, however, the female chucking dies 14, 15 and the male chucking dies 16, 17 together with the shearing blade 18, 19 are removed from the roll-off plane of the rolling dies 12, 13 and no longer travel along it.

But the male chucking dies 22, 23 continue to participate in the continuing rotary motion because they keep on chucking the profiled section 20 to the outside diameter of the rolling dies 12, 13.

Figure 7:
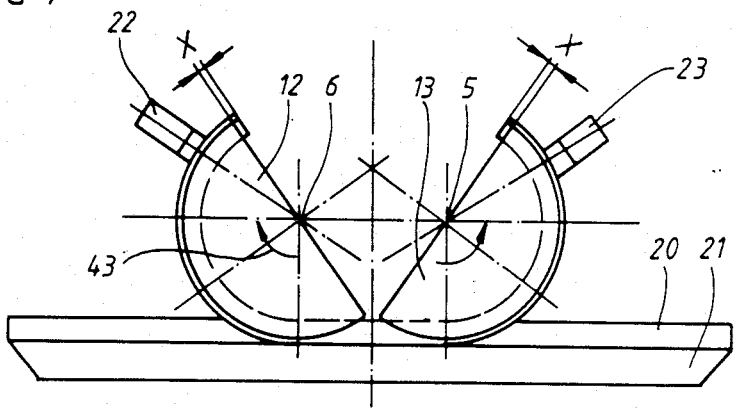
FIG. 7 is a side view of the rolling dies in the bending range of 90° to 180°.

Shown in FIG. 7 is the further progress of the rolling-/bending operation, it being evident that the two shafts 5, 6 have now reached the position 9 on the abscissa 2 in FIG. 5 and that the respective rolling die 12, 13 has now almost arrived at its final destination in the bending process.

Of importance in FIG. 7 is that the shearing blade 18, 19 always leaves an overhang x at the free rear end of the profiled section 20. This overhang x is utilized later to hot-pressure weld the two joined ends in the area of the butt joint 28 (see FIG. 8). Depending on the welding method used, the overhang x may be of any desired length. Instead of hot-pressure welding it is also possible to employ an appropriate flash butt welding or electron beam welding or cold-pressure welding method.

Figure 8:
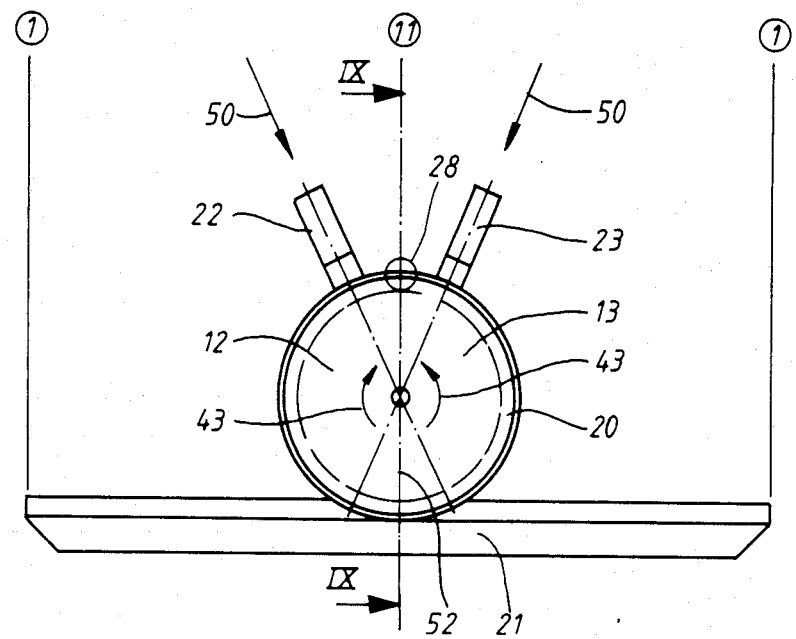
FIG. 8 is a side view of the rolling dies at the completion of bending the rounded portion.

FIG. 8 shows the finished-rounded profiled section 20, it being evident that the two rolling dies 12, 13 now result in an exactly rotation-symmetrical part and are joined together in the area of their connecting plane 52. The two rolling dies 12, 13, therefore, are exactly mirror-symmetrical relative to the connecting plane 52.

The butt joint 28 is now joined so that a welding operation described above can be carried out. It is important that the two male chucking dies 22, 23 still exert their tension in arrow direction 50. As described above, the profiled section 20 is now finished-rounded and joined together in the area of the butt joint 28 to form one complete part. Now the problem is encountered how to remove the rolling dies 12, 13 from the profiled section 20 closed in itself.

Figure 9:
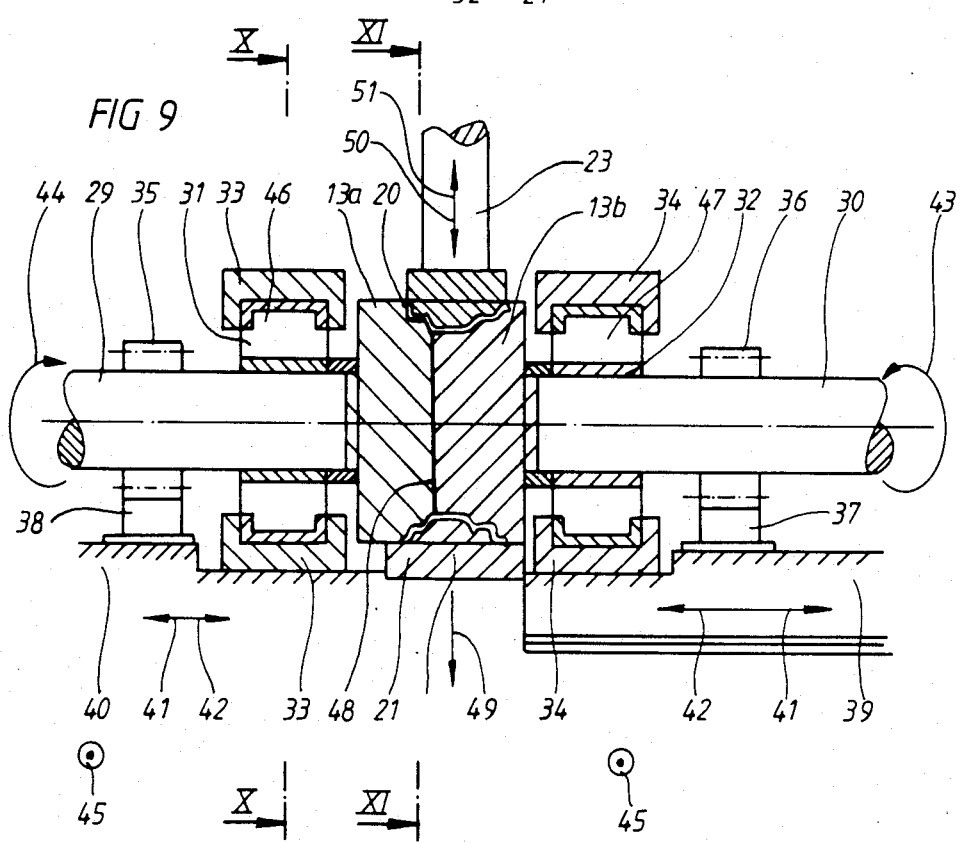
FIG. 9 is a side view, partly broken away, of the inventive apparatus.

How this is done in detail is explained by way of FIG. 9 which shows a section along line IX—IX in FIG. 8 and represents the section through the connecting plane 52 of the two rolling dies 12, 13.

Therefrom is also evident the rest of the structural design of the roll/stretch/bending device described.

Each rolling die 12, 13 consists of a two-piece part, FIG. 9 shows only the rolling die 13. Since the rolling die 12 is exactly identical with the rolling die 13, only the latter is described in greater detail for the sake of simplicity. It consists of the parts 13a and 13b.

Each part 13a, 13b corotates with a drive shaft 29, 30. The drive shaft 29, 30 is driven in rotation in the respective arrow directions 43, 44. This rotary drive is not detailed.

Corotating with each drive shaft 29, 30 is a pinion 36 which meshes with a rack 37, 38. The longitudinal axis of the rack 37, 38 is perpendicular to the drawing plane of FIG. 9, and when the drive shaft 29, 30 turns, the entire drive shaft 29, 30 including the parts 13a, 13b of the rolling die 13 moves out of the drawing plane of FIG. 9 in arrow direction 45. This requires that the drive shaft 29, 30 be guided transversely perpendicular to the drawing plane in FIG. 9. According to FIGS. 9 and 10, this guidance is provided in that there is fixed to the drive shaft 29, 30 a bearing sleeve 31, 32 which, in turn, is fixed to a bearing carriage 46, 47 movable perpendicular to the plane of FIG. 9. The outside of the bearing carriage is connected to a guide rail 33, 34 which is not movable in this travel direction, i.e. which is fixed.

It may further be seen from FIG. 9 how the male chucking die 23 presses in clamping fashion against the profile section 21 in arrow direction 50 or is lifted off the section in the opposite direction after the completion of the bending operation.

It is essential regarding FIG. 9 that, for the removal of the rolling dies 12, 13, the respective rolling die must now be pulled out of the profiled section 20 and closed in itself in the arrow directions 41, 42. For this purpose it is provided that the left part 13a with its drive shaft 29 attached to it performs a shorter axial motion by a shorter axial distance in arrow direction 41 than the right part 13b of the rolling die 13, which performs a longer axial motion in arrow direction 41, 42 in accordance with the profile depth of section 20. In other words, the rolling die 12, 13 consists of the parts 13a, 13b which cohere in the connecting plane 48 and are put together by any suitable means not detailed. The connecting plane 48 is not identical with the connecting plane 52 which was described in connection with FIG. 8, but is perpendicular to this connecting plane 52.

Therefore, a bending die is split into four parts, each rolling die 12, 13 consisting of two parts.

To release the bent profiled section 20, a separation along the connecting plane 48 is now brought about in that the parts 13a, 13b of the rolling die 13 are moved apart in the arrow directions 41 shown in FIG. 9. This requires that the guide rail 34 together with the transverse carriage 39, 40 be movable in the arrow directions 41, 42 and, in the application described, moved out in arrow direction 41 so that the parts 13a, 13b of the rolling die 13 will release the finish-bent profiled section 20 so that the latter can now be removed.

The parts 13a, 13b can be connected in the area of the connecting plane 48 by pins 53 which enter matching holes in the other part and transmit the torque when the parts are joined. Not detailed in FIG. 9 is the provision that the shaft 5 per FIG. 2 is first retained so that, in the transition to the position illustrated in FIG. 3, the rotary motion in arrow direction 43 is performed first with the shaft 5, 6 retained, the shaft being released only then so that it is only thereafter that the rolling/bending operation is carried out with the shaft released. This requires the arrestment of the entire bearing carriage 46, 47 and performing the rotary motion in arrow direction 43, resulting in the prestressing process during the transition from a position illustrated in FIG. 2 to a position illustrated in FIG. 3. Only then is the bearing carriage 46, 47 unlocked and the described rolling/bending operation initiated as described in connection with FIGS. 4 through 8.

Each bearing carriage 46, 47 is movable for this purpose in the area of a guide slot 54 in arrow direction 43, 44 and 45, respectively, and in the opposite direction thereto, the guide slot 54 being formed by the space between the mutually opposing and spaced parallel guide rails 33, 34.

FIG. 9 also shows that after the completion of the bending operation, the profiled roll-off rail section 21 is taken off downwardly in arrow direction 49, whereas the male chucking dies 22, 23 are lifted upwardly in arrow direction 51 so that the finish-bent profiled section 20 can be removed from the bending die.

Another preferred embodiment to execute the rolling/bending operation described in FIGS. 12 through 16 differs from the embodiment example according to FIGS. 1 through 8 only in that the two rolling dies are not of the same shape and that the motion cycles of the two rolling dies are not symmetrical. It is explained below that the rolling die 62 shown on the left side of FIG. 12 always stays in position 1 of the abscissa 2 with its shaft retained stationarily, whereas the right rolling die 63 only turns by a 90° rotation, thereby moving in the direction of the abscissa. As before, the profiled roll-off rail section 61, contacting the underside of the profiled section 20 in the opposite position relative to the section 20 to be bent, is movable in the direction of the abscissa 2.

From a production engineering point of view this arrangement is easier to produce.

The left rolling die 62 consists of a cylindrical body, out of the cross-section of which a circular sector has been cut, while the right rolling die 63 matches this cutout circular sector exactly. After the completion of the rolling/bending operation both rolling dies unite to form one closed part of the outside diameter U which corresponds to the inside diameter of the profiled section 20 to be bent.

Figures 12, 13:
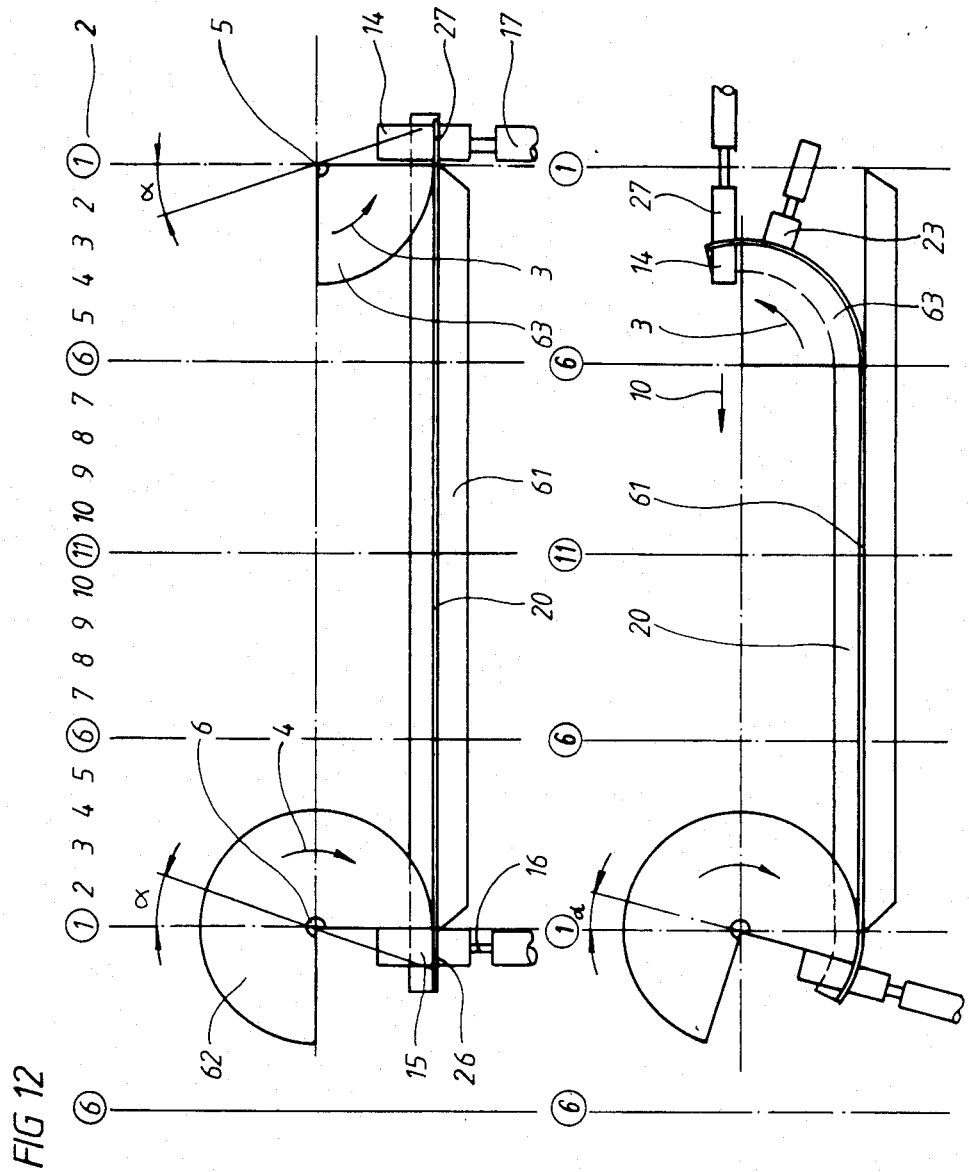
FIG. 12 is a side view illustrating the roll/stretch/bending operation in its initial stage in a second embodiment of the invention.
FIG. 13 is a side view of the rolling dies after the initial bend.

FIG. 12 shows the basic situation where the rolling die 62 is stationary and its male chucking die with the opposite female chucking die 15 has chucked the chucking end 26 of the profiled section 20. The latter rests on a profiled roll-off rail section 61 which has the same profile as the section to be bent. The right side shows the rolling die 63 whose shaft 5 is fixed to start with and whose female chucking die 14 with the opposite male chucking die 17 has likewise chucked the chucking end 27 of the profiled section 20.

In the transition from the position shown in FIG. 12 to the position shown in FIG. 13 the first motion starts, the left rolling die 62 turning in arrow direction 4 by a distance referred to as angle alpha, while the right rolling die 63 turns in arrow direction 3, also by the distance angle alpha. During the prestressing operation both shafts 5, 6 are retained. As in the first embodiment example, the profiled section 20 to be bent remains under this preload throughout the entire bending process.

Upon the completion of this rotation the two rolling dies remain in an intermediate position not shown.

After passing through this intermediate position the right rolling die 63 continues turning, according to FIG. 13, in arrow direction 3 so that it winds the profiled section around its circumference, the die 63 at the same time rolling off the profiled roll-off rail section 61. The right side of FIG. 13 shows the conclusion of the rolling-off process. The rolling die 63 has turned by exactly 90°, the shaft 5 having moved along the profiled roll-off rail section 61 in arrow direction 10. After the conclusion of this rolling operation a male chucking die 23 is positioned to contact the outside diameter of the rolling die 63.

FIG. 14 shows the next motion cycle. In FIG. 14, the left rolling die 62 now starts to rotate further in arrow direction 4, it being important that its shaft is locally fixed. In so doing its chucking dies 15, 16 winds the profiled section 20 towards itself, the profiled roll-off rail section 61 at the same time being moved towards the left rolling die 62 in arrow direction 64. The shaft 5 of the right rolling die 63 is now rigidly connected to the profiled roll-off rail section 61 by connecting members not detailed so that the two parts (profiled roll-off rail section 61 and rolling die 63) are wound together towards the left rolling die 62, moving in arrow direction 64.

FIG. 15 shows the motion cycle shortly before the conclusion of the winding operation, namely at a 270° rotation of the left rolling die 62. With its shaft 6 locally fixed, the left rolling die 62 has turned further in arrow direction 4 and the profiled roll-off rail section 61 has moved further in arrow direction 64.

Pertaining to FIG. 14 it should yet be mentioned that, as in the first embodiment, a corotating male chucking die 22 then contacts the outside diameter of the left rolling die 62 and a corotating male chucking die 23 contacts the other side of the rolling die 63, a saw 65 or a shearing blade then arriving from the respective sides in the work cycle to cut off the lost heads (chucking ends 26, 27).

The corotating chucking dies 22, 23 continue to participate in the rotation, resulting in the motion situation described in FIG. 15 which differs from that in FIG. 14 by a traversed angle of 90°.

FIG. 16 now shows the form-closing butting of both rolling dies, whereby the profiled section 20 is wound around the entire circumference of the two mutually engaging rolling dies 62, 63, the corotating chucking dies 22, 23 still resting against them.

The die 62 shown in FIG. 16 then has exactly the same shape as the die 13 shown in FIGS. 9 through 11.

The roll/strength/bending method shown can be applied to all critical, severely profiled sections, i.e. not only to wheel rim sections, but also to e.g. bumper sections, sections for industrial structural and construction purposes, beam barriers, asymmetrical cooling coil sections, ornamental strips and the like.

In FIG. 17 is shown a third embodiment example of the roll/stretch/bending method in which the left rolling die 92 is designed as solid cylinder and the right rolling die is omitted, there being provided instead only a chucking die consisting of a female chucking die 14 and a coordinated male chucking die 17. The chucking die chucks the chucking end 27 of the profiled section 20 to be bent and throughout the entire bending operation imparts a tension to the profiled section 20 in arrow direction 8.

Now, the rolling die 92 consists of a solid round section which performs a winding motion in that, while applying a prestress in arrow direction 8, the rail 61 moves to the left in arrow direction 64, while the rolling die 92 turns in arrow direction 4. The rotation of the rolling die amounts to 360°, whereby a radius of the bent wheel rim slightly bigger than the desired radius is obtained. The finished bend is obtained by simply placing the bent wheel rim in an appropriate mold and welding the still separated butt ends together.

It is pointed out that the same chucking and sizing operations are performed in FIG. 17 as explained in FIGS. 12 through 16, which means that several chucking dies known in the art are present in the same manner, contacting the profiled section 20 successively in the manner described, and a sizing saw known in the art is present to cut off the chucked end of the profiled section 20.

FIGS. 18 through 24 now show wheel rims consisting of a rim ring and rim pan which can be produced from a single part by one of the three above described embodiment variants of the roll/stretch/bending method.

By way of the next Figures it will be demonstrated how a preferrable wheel rim shape can be produced by the roll/stretch/bending methods described. The heart of this embodiment is that an integral wheel rim is produced, i.e. rim pan and rim ring are integrally joined to each other and are finished-bent in accordance with the above described embodiment examples. This entails a significant advantage because in the past costly connecting operations were required to join a separate rim ring to a separate rim pan, for example.

The heart of the embodiment example, therefore, is that even complicated wheel rim shapes can be produced in one piece by the roll/stretch/bending method described.

Figure 18:
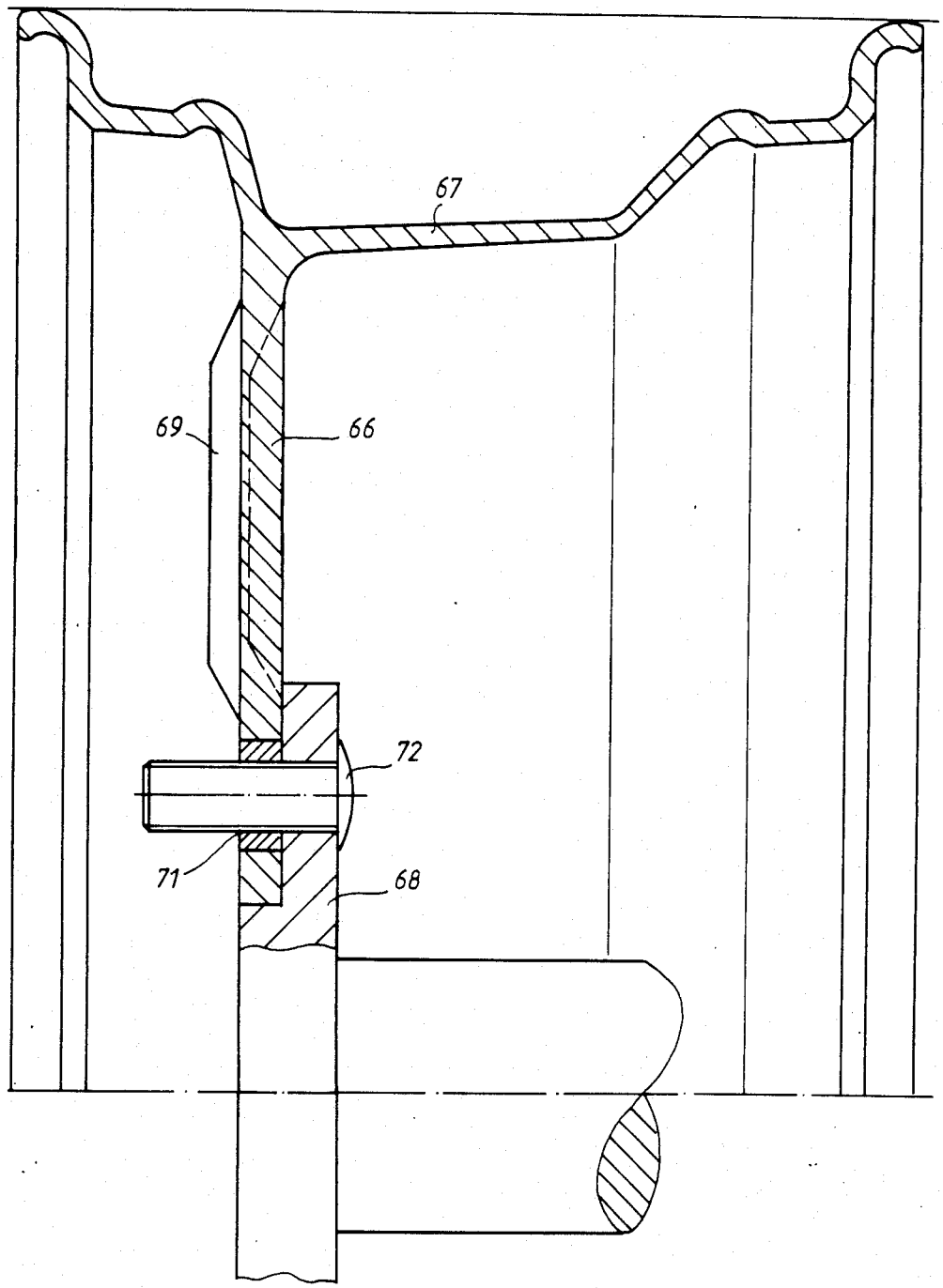
FIG. 18 is a side view of a completed wheel rim produced in the first embodiment of the invention.

FIG. 18 shows such a wheel rim shape as produced by the above described roll/stretch/bending method. It consists of a rim pan 66 integrally joined to a rim ring 67. In the original, i.e. the raw state, there is an extruded section in the form of a straight profiled section 20 having a perpendicularly projecting leg 66 which, in the rounded state, becomes the rim pan 66. By the same token, the rim ring 67 is finished-bent from a straight part into a completely round part.

FIG. 18 shows such a finished-bent wheel rim screwed by screws 72 to an axle flange 68, each screw 72 penetrating mutually aligned holes 71 in the axle flange 68 and in the rim pan 66 and fastened by threaded nuts not detailed.

During the roll/stretch/bending operation material is displaced in the area of the rim pan 66, leading to the formation of ribs 69 running from radially inward to radially outward. These ribs 69 reinforce the section of the rim pan 66 and serve to stiffen it. It is important in the roll/stretch/bending method that the upset is kept quite small in comparison with conventional bending methods. Due to the new bending technique sufficient material in the form of the leg 66 can be made available to cause the material to flow radially inward within the bending operation or to form the pan by foring, coining, pressing, etc. in a subsequent, secondary operation.

It is only through this design that the forming of such large volume sections is made possible at all.

In the area of the rim pan there results a residual upset volume, the residual material of which must be displaced by a cold flow operation.

Figure 21:
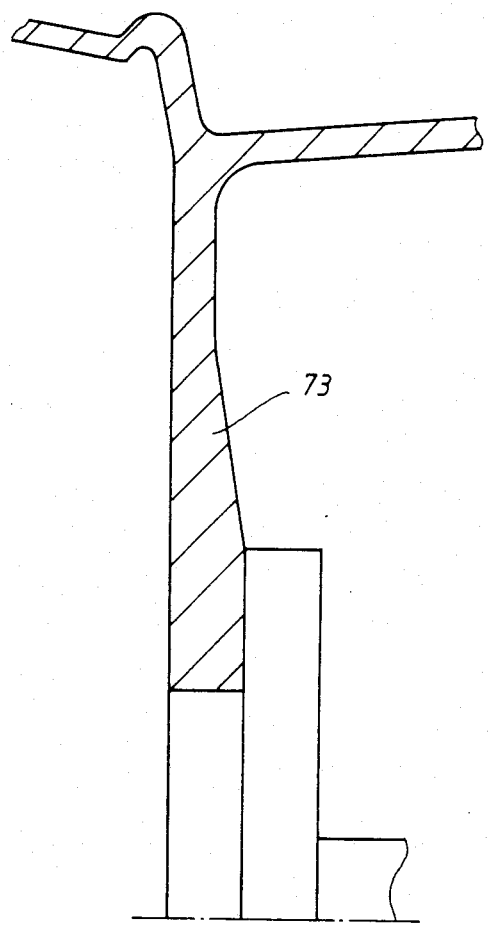
FIG. 21 is a side view, in partial cross section, of a second embodiment of a wheel rim.

There are several possibilities to reshape this displaced material, namely, in the form of ribs 69 as shown in FIG. 18, or in the form of a thickened section of the rim pan 73 as shown in FIG. 21, or else by extending the rim pan 66 radially (towards the center), retaining a uniform section. The rims 69 ca be obtained by a coining operation as described in connection with FIG. 24. Another possibility is the elimination of the upset forces by stamping slots 70' into the rim pan 66.

Figure 20:
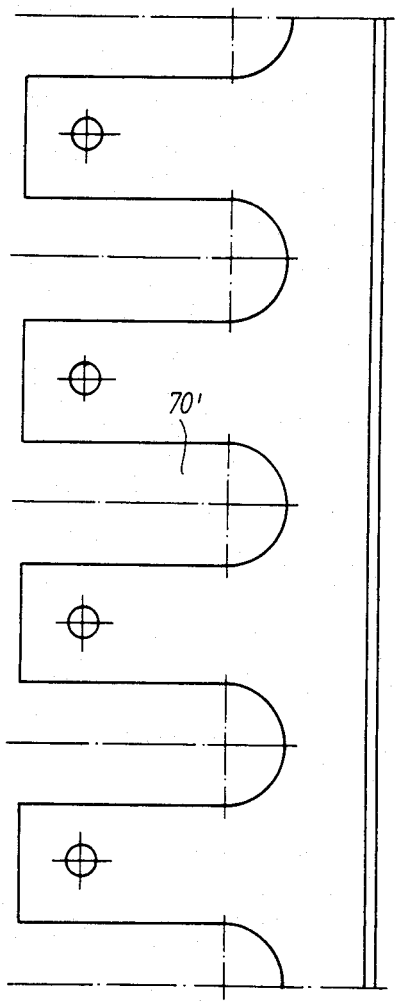
FIG. 20 is a top plan view of a projection with cutouts forming the rim pan after the completion of the bending operation.

According to FIG. 20, the web of the future rim pan 66 is slit in its straight condition by providing slots 70 which are mutually parallel in the originally unbent shape, their ends located radially inward then being closed during the bending operation. FIG. 20 shows the straight, unbent rim pan, i.e. the straight portion which is later bent to form the rim pan, and FIG. 19 the finish-bent rim pan 66, where the straight slots 70 have become tapered slots 70 whose ends located radially inward have been compressed.

The rim pan 66 has several holes 71 distributed over its circumference, each penetrated by a screw 72 which connects the rim pan 66 to the axle flange 68.

FIG. 21 shows that the residual material originating in the forming operation ca also be reshaped in the form of a thickened section into a rim pan 73 of thicker section.

Figure 22:
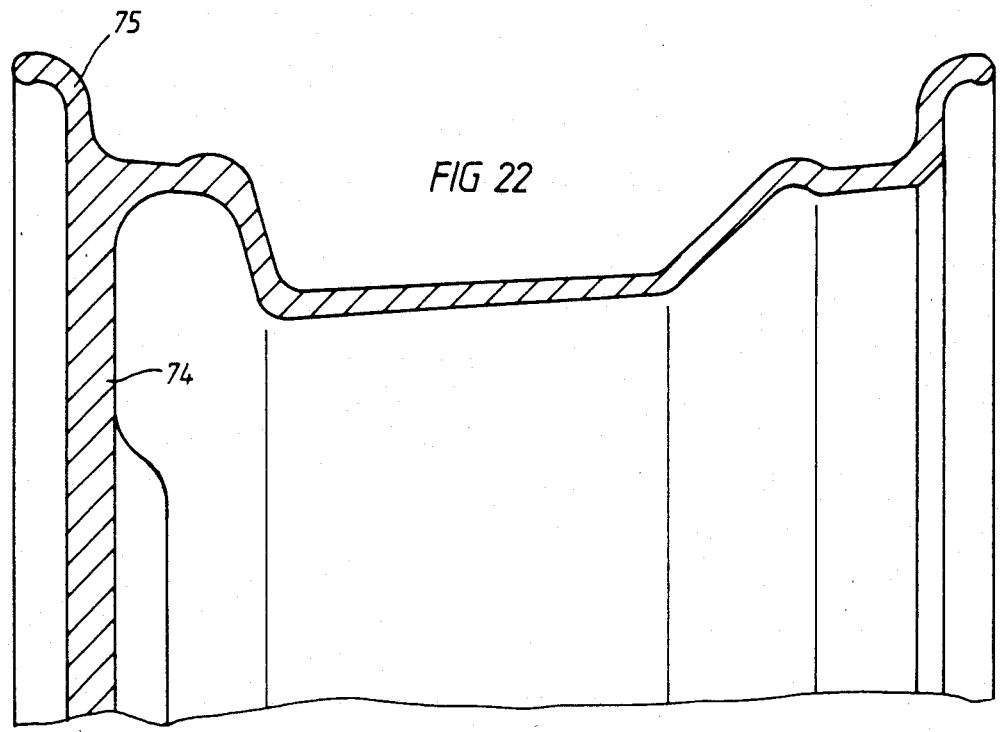
FIG. 22 is a side view, in partial cross section, of a third embodiment of a complete wheel rim.
Figure 23:
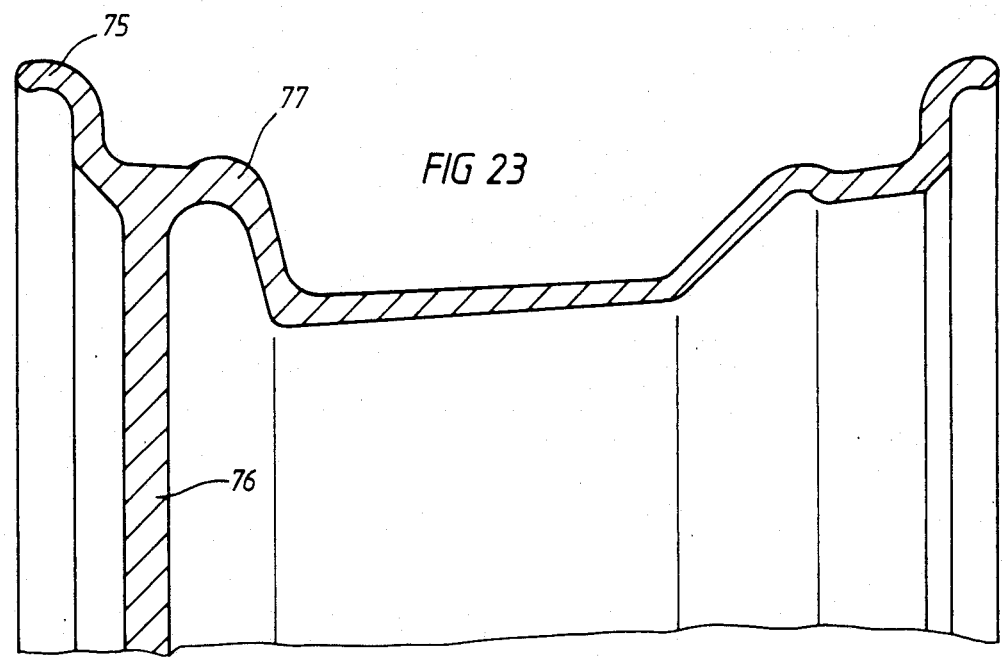
FIG. 23 is a side view, in partial cross section, of a fourth embodiment of a complete wheel rim.

FIG. 22 shows that the rim pan 74, integrally joined to the rim ring, is positioned as an extension of the rim horn 75, while FIG. 23 shows that the rim pan 76 may be disposed between the rim horn 75 and the rim hump 77.

Figure 24:
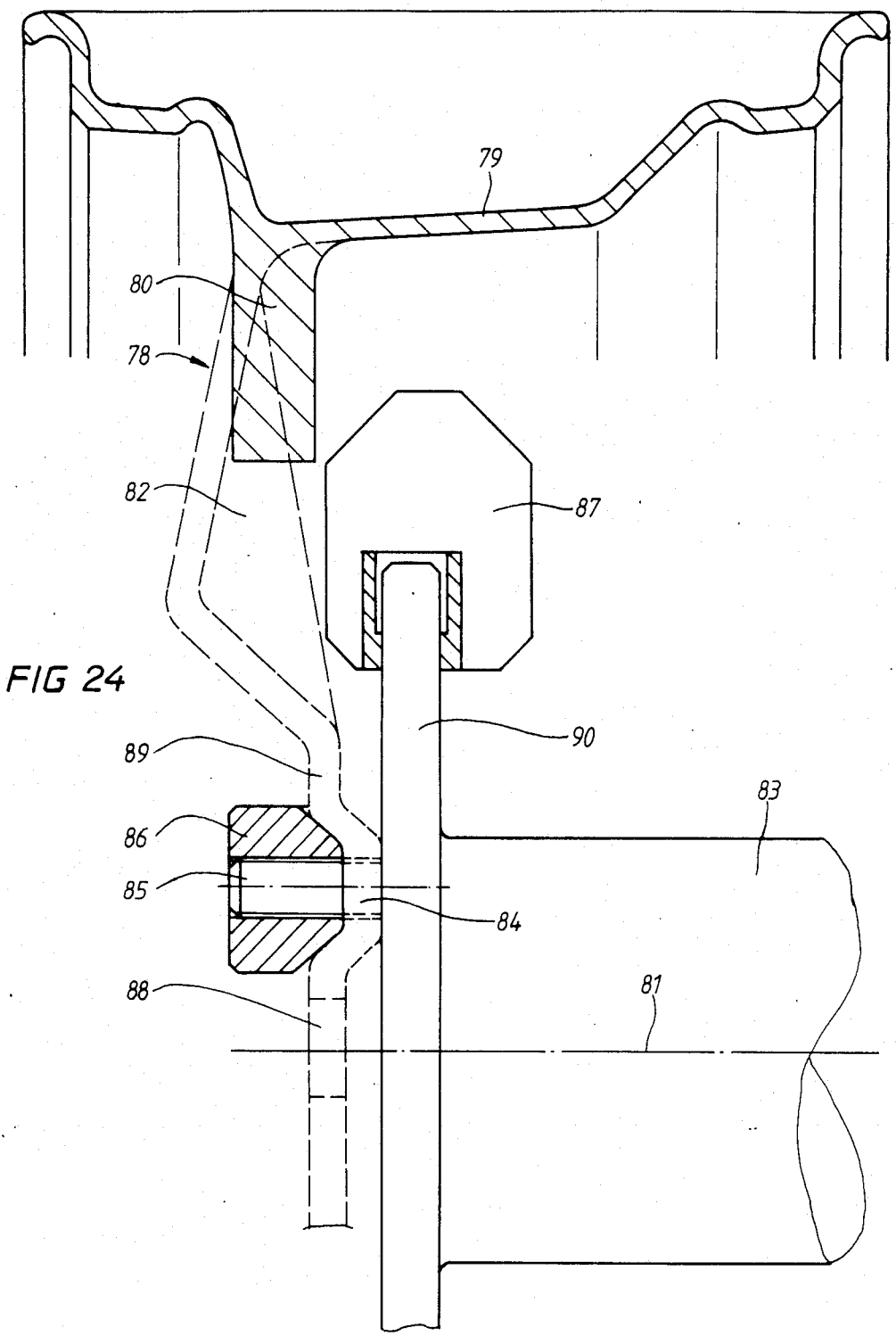
FIG. 24 is a side view, in partial cross section, of a fifth embodiment of a complete wheel rim.

FIG. 24 demonstrates that a complete, material-integral wheel rim consisting of a rim ring and a rim pan joined to it can also be produced in two separate operations.

The first operation relates to bending the rim section round first, in which operation the rim pan 78 is not shaped completely, but after the conclusion of the roll/stretch/bending operation is present only in the form of a thickened projection 80 in the profile as shown in FIG. 21. Now, in order to complete the shape of the rim pan 78, the roll/stretch/bending operation is followed by a flow/press operation. Similar to the way a forging press brings about a material flowing process to obtain an enlargement of the material area, a rim pan 78 of a thinner section is formed by flow/pressing from the thickened circularly bent rim pan 78.

The procedure described in FIG. 24, therefore, pursues a different avenue than was described with reference to the FIGS. 18 through 23. Therein, the complete wheel rim is produced in a single operation because the rim pan is already being produced in its final section by the roll/stretch bending method.

Possible secondary operations such as providing impressions in the area of the wheel stud holes, riblike impressions, etc., to better absorb the material deformations, are not being considered here.

In other words, the rim pan 78 with the projection 80 is the product of the previously described roll/stretch-/bending operation. The projection 80 is then reshaped into the rim pan 78 shown in broken lines by a flow/-press operation. For this purpose both sides of the projection 80 are engaged by press jaws known in the art which carry out the flow/pressing operation and which then finally reshape the rim pan 78 shown in broken lines.

The reshaped rim pan 78 has ribs 82 which are distributed over its circumference and produced by a flow-stamping process. In other words, these ribs 82 were produced during the flow-pressing operation. In the same manner slots can be stamped out to assure the dissipation of hot air from the brake, or to assure cooling of the brake.

The ribs 82 transition into a connecting part 89 in which the holes 84, distributed over the circumference and provided with the connecting flange 90 for a brake disc, are provided, the whole arrangement being fastened to a wheel hub 83 by means of wheel nuts 86.

The connecting flange 89 has at its lower part, in the area of the axis of symmetry 81 (wheel center) a center bore 88 for attachment to the wheel hub 83.

On the top of the connecting flange 90 for the brake disc is also shown, not to scale, the brake support 87.

I claim:

1. A method for the manufacture of rounded metal sections in the shape of a wheel having ends connected by welding butt joints comprising the following steps:
    (a) selectively prestressing a straight metal section by chucking said straight metal section at its free ends in a direction along a longitudinal axis of said straight metal section;
    (b) attaching at least one of said free ends of said straight metal section to an outside diameter of at least one rolling die;
    (c) bending said straight metal section around said rolling die to form a rounded metal section in the shape of a wheel, pressing a roll-off rail section with an adjustable force against an underside of said straight metal section as said straight metal section is bent around said rolling die, and fastening a second free end of said straight metal section to a second rolling die;
    (d) simultaneously rolling siad first rolling die in a clockwise direction toward a center axis of said straight metal section and rolling said second rolling die in a counterclockwise direction toward said center axis;
    (e) joining said first and second rolling dies together to form a unit inside said rounded metal section at said center axis of straight metal section; and
    (f) removing the rounded metal section from said rolling dies.

2. A method according to claim 1, wherein said bending step includes said first and second rolling dies having a semicircular shape.

3. A method according to claim 1, wherein said rolling step includes turning said first and second rolling dies to an angle alpha relative to said longitudinal axis of said straight metal section, prior to winding said free ends of said straight metal section around said rolling dies.

* * * * *